United States Patent [19]

Finch et al.

[11] Patent Number: 4,522,119

[45] Date of Patent: Jun. 11, 1985

[54] OLIVE OIL RECOVERY

[75] Inventors: Harvey E. Finch, Foster City; Salvatore P. Trapanese, Millbrae, both of Calif.

[73] Assignee: FPS Development Partnership, Sacramento, Calif.

[21] Appl. No.: 600,134

[22] Filed: Apr. 13, 1984

Related U.S. Application Data

[60] Division of Ser. No. 345,554, Feb. 4, 1982, Pat. No. 4,452,744, which is a continuation-in-part of Ser. No. 220,170, Dec. 23, 1980, Pat. No. 4,370,274.

[51] Int. Cl.$^3$ .............................................. A23N 1/00

[52] U.S. Cl. ........................................ 99/483; 99/511; 99/513; 99/547; 100/117; 100/145

[58] Field of Search ................. 99/467, 469, 470, 547, 99/483, 484, 495, 496, 509-513, 516, 534; 100/117, 145; 260/412, 412.2, 412.3; 426/282, 485

[56] References Cited

U.S. PATENT DOCUMENTS

| | | | |
|---|---|---|---|
| 2,325,327 | 7/1943 | Lachle | 260/412.3 |
| 3,231,390 | 1/1966 | Hoover | 260/420 |
| 4,024,168 | 5/1977 | Homann et al. | 100/117 X |
| 4,253,390 | 3/1981 | Hunt et al. | 100/117 X |
| 4,357,865 | 11/1982 | Knuth et al. | 100/117 |
| 4,361,081 | 11/1982 | Howard | 100/117 X |
| 4,370,274 | 1/1983 | Finch et al. | 260/412.3 |

*Primary Examiner*—Timothy F. Simone
*Attorney, Agent, or Firm*—Christie, Parker & Hale

[57] ABSTRACT

Olive oil is recovered from olives by separating olive pits from olives to obtain a pitless olive meat, by maintaining the pitless olive meat at a temperature of about 70° F. to about 110° F., by introducing the pitless olive meat to an extraction zone, by withdrawing a liquid phase comprising olive oil, water, and a minor proportion of pulp from a first portion of the extraction zone, and by withdrawing a substantially dry solid olive pulp from a second portion of the extraction zone. The pulp and water are separated from the oil to obtain a pure olive oil. An inert additive is mixed with the pitless olive meat before extraction to increase the yield of product olive oil. Where olive culls are used as the starting material, the culls are wetted before the pits are separated.

13 Claims, 2 Drawing Figures

OLIVE OIL RECOVERY

CROSS REFERENCE TO RELATED APPLICATIONS

This is a division of application Ser. No. 06/345,554, filed Feb. 4, 1982, now U.S. Pat. No. 4,452,744, which is a continuation-in-part of application Ser. No. 220,170, filed Dec. 23, 1980, now U.S. Pat. No. 4,370,274, issued Jan. 25, 1983.

FIELD OF THE INVENTION

This invention provides a new and improved method for processing olives to recover an olive oil having superior taste and purity.

BACKGROUND OF THE INVENTION

Recovery of oil from olives is a major industry. One process for oil recovery which reaches into antiquity is simple pressing. High oil content seeds, such as sesame and peanut, and the oily pulp of olives yield free oil by the simple application of pressure. Oils of this type require no further processing. However, simple pressing is not efficient and is not utilized for processing underripe or green olives.

The olive meat remaining from simple pressing contains a substantial amount of valuable oil. This led to the development of more efficient presses, such as the hydraulic batch press and the expeller. These presses operate on a batch or noncontinuous basis and typically develop pressures of about 1 to 15 tons per square inch, leaving 2 to 4% oil in the meat. Unfortunately, such presses also develop excessive heat. This causes darkening of the oil and denaturization of olive oil protein.

Extracting oils on a batch basis is labor intensive. A high degree of operator attention is required to monitor pressure, the progress of oil extraction and other factors. Sophisticated machinery can be used to avoid human error; however this significantly increases capital and maintenance costs.

The post-press solvent extraction method was introduced to reduce damage to olive oil during crushing and as a means of removing all of the available oil. In this process, the the olive is batch pressed to remove only part of the available oil. The temperature at this point is not sufficient to degrade the oil or protein to any great degree. Solvent extraction, typically performed with hexane, is then used to remove the balance of oil from the meat.

However, solvent extraction requires careful control and removal of the solvent, which has the potential of being carcinogenic. Olive oil which has been treated by any method using a solvent cannot be marketed as "virgin" olive oil.

The conventional cold-pressing process of olive oil extraction involves several steps. First, ripe olives are picked and stored awaiting extraction. Good practice includes placing these stored olives under a nitrogen blanket to prevent spoilage.

The next step involves crushing which is performed in a press on a batch basis. The whole olives are first shredded and squeezed until the pits are broken. These broken pits function as a conduit to allow the liquid to exit.

The length of liquid travel, from the center of the pressed material to an exit port, can be as great as one foot in a typical two-foot diameter batch press. Such a long liquid travel length reduces the efficiency of liquid extraction to an extent that multiple pressings are sometimes required. However, a reduced press diameter would not solve the problem because it would require a greater number of pressings to process an equivalent volume of olives and correspondingly greater operator attention.

The liquid (water and oil) runs about 30% pulp, which must be removed before the liquid can be purified. The liquid is allowed to settle and the pulp is removed by decantation. The clarified liquid is centrifuged to separate the water from the oil so that the oil has a water content of less than about 1%.

Depending on the quality of the olives used, which depends on the percentage of rotten olives processed, the oil may then be decolorized by making a soapstock to remove any free-fatty acids present, or by filtering with activated carbon, or both.

The oil recovered in the cold-pressing conventional process contains an oil from the olive pit which has a bitter taste. This inferior oil corrupts the product olive oil and lowers its quality.

The pulverized olive meat contains nutrient values and has potential salvage value. However, the sharp broken pit pieces are mixed thoroughly with the meat and present a safety hazard for animals, if the meat is to be used as a feed material. The pits are not removed before crushing because the pieces are needed during the squeezing process to provide a conduit to allow the liquid to exit. To then separate the broken pits from the pulverized meat would be an expensive and inefficient proposition.

There is need for a process for olive oil recovery which yields an olive oil that is pure, contains no solvents, has not been denatured, an which is free from the bitter taste of the olive pit. There is also need for an olive oil recovery process which efficiently salvages the pulverized olive meat and pits, and which does not require a great degree of operator attention.

SUMMARY OF THE INVENTION

This invention provides an olive oil recovery which yields an oil which is pure, which is processed at a temperature which does not risk denaturation and which does not require extraction by solvents to be efficient. Olive pulp and olive pits, which in conventional methods are waste material, are recovered and salvaged using the principles of this invention. The product olive oil is superior in quality and lacks the bitter and inferior oil from the olive pit.

In terms of method, the invention comprises separating olive pits from olives to obtain a pitless olive meat, mixing an inert edible agent with the pitless olive meat to form an admixture, said agent being incompressible relative to the pitless olive meat, introducing the pitless olive meat to an extraction zone, withdrawing a liquid phase comprising water, olive oil, and a minor proportion of olive pulp from a first portion of the extraction zone, and withdrawing a substantially dry solid pulp from a second portion of the extraction zone. The method also comprises separating the minor proportion of olive pulp from the liquid phase for obtaining a mixture comprising olive oil and water, and separating water from the mixture for obtaining an olive oil substantially free of water.

In an alternate preferred practice of this invention, the method further comprises, after separating olive pits from olives to obtain a pitless olive meat, maintaining the pitless olive meat at a temperature of between at least 80° F., to no more than about 110° F.

Preferably the separated olive pits are collected for use as a fuel, while the substantially dry solid olive pulp is collected for use as a biological feed material.

If desired, the separated pulp may be recycled for further oil recovery.

Olive culls used as starting material are preferably pretreated by wetting before pitting. The wetting aids separation of olive pulp from the pits.

In terms of apparatus, the invention comprises means for separating olive pits from olives to obtain a pitless olive meat, means for introducing the pitless olive meat to an extraction zone, means for withdrawing a liquid phase comprising water, olive oil, and a minor proportion of olive pulp from a first portion of the extraction zone, means for withdrawing a substantially dry solid olive pulp from a second portion of the extraction zone, means for separating the minor proportion of olive pulp from the liquid phase for obtaining a mixture comprising olive oil and water, and means for separating water from the mixture for obtaining an olive oil substantially free of water.

In an alternate preferred embodiment, the invention further comprises means for maintaining the pitless olive meat at a temperature of between about 70° F. to about 110° F.

An olive oil is produced by separating olive pits from olives to obtain a pitless olive meat, mixing an inert edible agent with the pitless olive meat to form an admixture, the agent being incompressible relative to the pitless olive meat, compressing the admixture at a temperature below about 110° F. to extract a liquid phase comprising water, olive oil, and a minor proportion of pulp, separating the minor proportion of pulp from the liquid phase to obtain a mixture comprising olive oil and water, and separating water from the mixture for obtaining an oil substantially free of water.

BRIEF DESCRIPTION OF THE DRAWINGS

These and other advantages of the invention will become apparent in the following detailed description of the invention, which is presented with reference to the accompanying drawings, wherein.

DESCRIPTION OF THE PREFERRED EMBODIMENT

Figure 1:
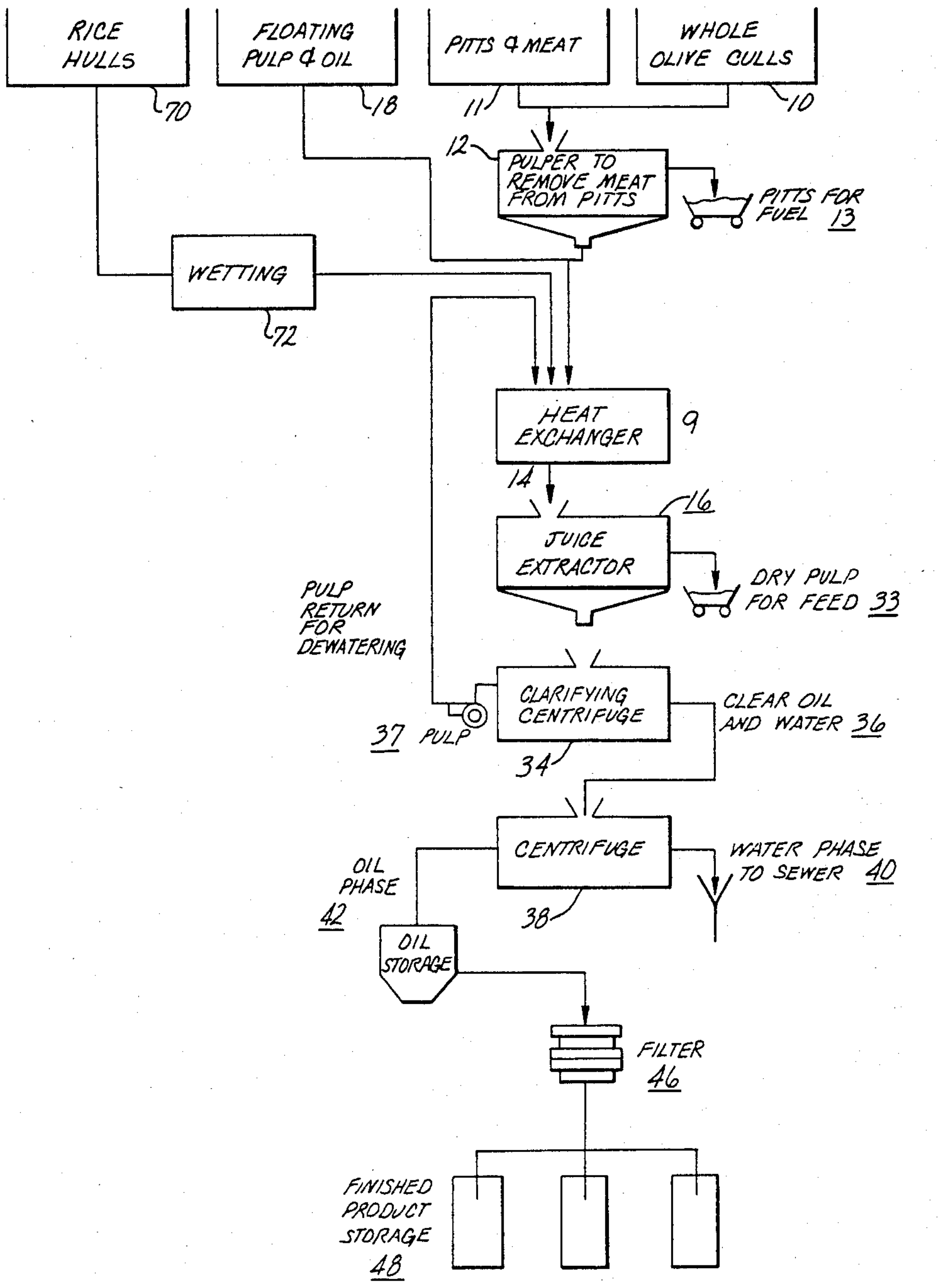
FIG. 1 is a schematic diagram illustrating a preferred process of olive oil recovery, according to this invention.

FIG. 1 is a schematic diagram illustrating the presently preferred process of olive oil recovery according to this invention. Olives are continuously fed to a pulper 12 to separate the olive pits from the olives to obtain a pitless olive meat. As used herein, "olives" can be whole olive culls 10, which may be at any stage of maturity from green to overripe, or can be a residue 11 of olive meat containing olive pits as salvage from a conventional olive coring or pitting process. The pits are preferably collected in a bin 13 and dried for salvage as a fuel or the like.

The pulper functions to separate olive pits from the olive to obtain a pitless olive meat. The pulper is any conventional pulper finisher capable of segregating the pits without breaking them, which would otherwise cause sharp pieces to become embedded in the olive meat. Such pulpers are currently in use, for example, for separating seeds from tomatoes and for pulping cling peaches.

In the presently preferred embodiment, an FMC 100 pulper finisher manufactured by FMC, Inc. of San Jose is used. The pulper contains a nylon bristled brush having helical flights of flexible bristles which are mounted in a cylindrical perforated screen. The brush spins at about 100 to about 600 rpm. Olives fed into one end of the pulper are shredded with the olive meat passing through the perforations and the pits being collected from the other end. The helicity of the bristles functions like a screw and causes the material to pass form one end of the pulper to the other. The olive meat is separated from the pits without breaking off pieces of olive pit. If desired, whole olive culls may be pretreated by passage between the spring-loaded rollers of any conventional durometer, which is capable, through its rollers, of imparting sufficient pressure to initially break the skin of the olive without breaking the pit.

Olive culls frequently yield a pasty pulp. Accordingly, it is desirable to feed a water-containing fluid internally into the pulper with olive culls. The water aids the process of flailing the pulp from the pits and keeps the pulper screen free from fouling. About 20 to about 30% by weight water added with culls generally suffices for these purposes.

From the pulper the pitless olive meat 14 is maintained at a temperature of at least about 80° F., preferably by passage through a conventional shell and tube heat exchanger 9, which includes a product conduit surrounded by a steam jacket. The pitless olive meat is exposed to heating (or cooling if desired) as it passes through the product conduit. Preferably the meat is maintained at a temperature between about 80° F. and 90° F., although the temperature may be as high as about 100° F. Above about 110° F., there is substantial risk that the olive oil may degrade or denature, while below about 70° F., we believe that the viscosity of olive oil mixed with water is relatively high so that a liquid phase including olive oil and water, which is to be extracted from the pitless olive meat in the next step of the process, resists extraction.

Figure 2:
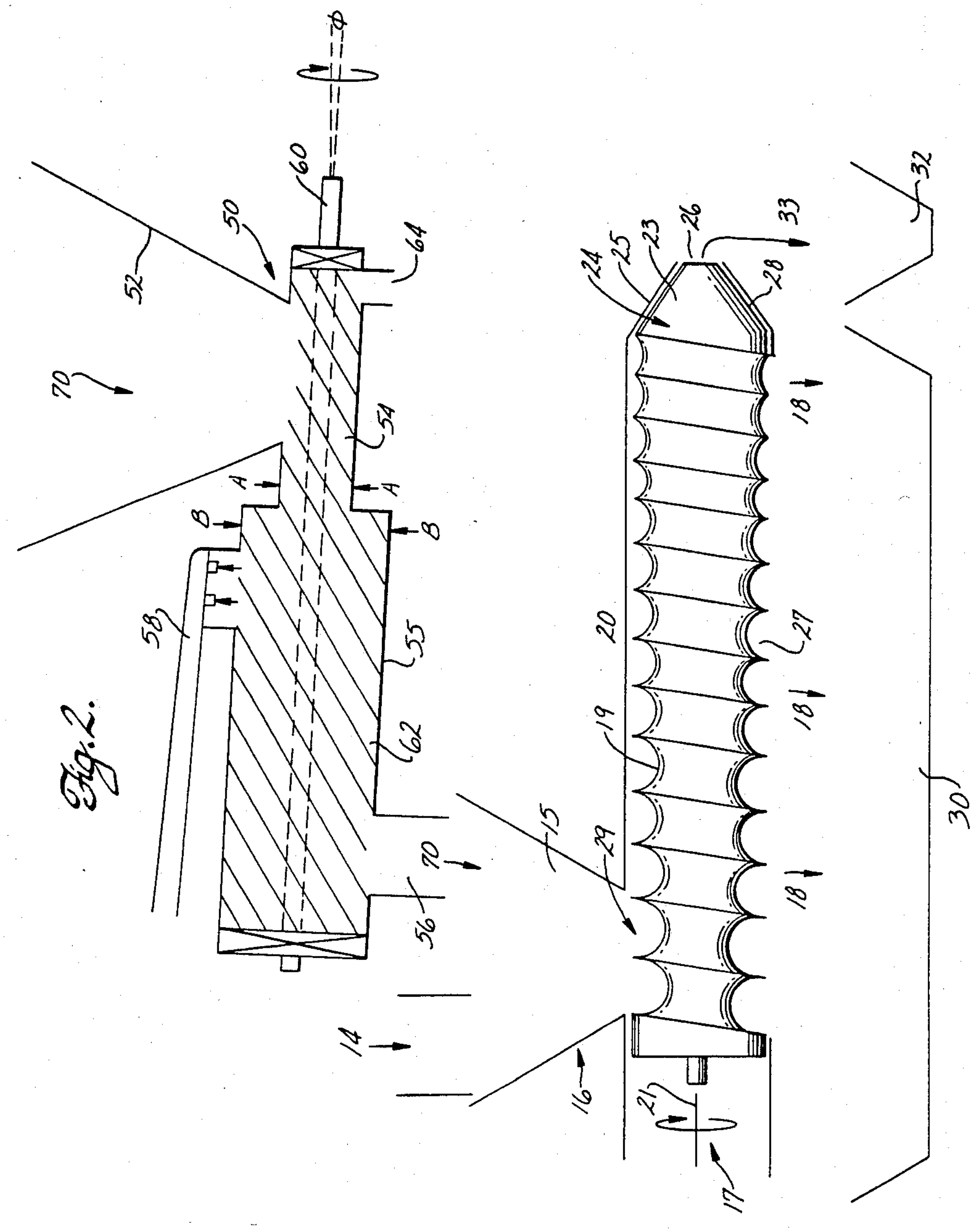
FIG. 2 is a cross sectional elevation of a device for mixing and wetting raw rice hulls with pitless olive meat and extracting a liquid comprising water, olive oil, and olive pulp therefrom.

From the heat exchanger 9 the pitless olive meat is continuously introduced into a hopper 15 of a juice extractor 16, which is more clearly shown in FIG. 2. The juice extractor is a continuous press 17 which functions as an extraction zone. Extractor 16 preferably is a positive displacement pump, which comprises an extractor screw 19 enclosed by a housing 20. An interface 22 between hopper 15 and screw 19 is a locus of continuous introduction of pitless olive meat 14 into an extraction zone 29 formed by screw 19 and housing 20. The extractor screw is preferably horizontal and has a progressively increasing root diameter with threads beginning at about 65° at interface 22 and increasing to about 80° helicity along its longitudinal axis 21. The root diameter is approximately 50% of the full outside diameter of the screw at the feed end at interface 22 and increase to a maximum of approximately 90% at the opposite or downstream end 24.

The housing 20 is preferably cylindrical and concentrically encloses screw 19. Preferably there is a clearance of about 1/16" to about ¼" between housing 20 and the flights of screw 19. The housing is split along longitudinal axis 21 for ease in maintenance and cleaning. In the presently preferred embodiment, housing 20 is a cylindrical screen which has 0.020 inch diameter perforations. Housing 20 has a diameter of about one foot and is about three feet long.

Extractor screw 19 has a frustoconical rotor tip 23 at its downstream end 24. Perforated housing 20 is integrally joined with a female conical stator portion 25 which follows the contour of tip 23. Stator end portion 25 is not perforated and has a central discharge opening 26. Stator end portion 25 is preferably spring loaded and provides an adjustable narrow clearance 28 between itself and extractor screw tip 23, while resiliently receiving tip 23.

Pitless olive meat 14 from hopper 15 is continuously taken up by extractor screw 19 and continuously introduced into extraction zone 29. Rotation of the extractor screw pulpifies the olive meat and causes it to pass through the extraction zone toward downstream end 24. During its passage between interface 22 and downstream end 24, the olive pulp is progressively forced along the perforated portion of the housing by virtue of the progressively increasing root diameter of the rotating screw. The progressive forcing of the olive pulp against the housing subjects the pulp to a progressively increasing extraction pressure which is sufficient to continuously withdraw a liquid phase 18 through the perforated portion of housing 20. However, the temperature of the pulp is not permitted to rise above about 110° F. at any time during extraction to avoid degrading the olive oil. Preferably the extraction temperature is maintained between about 80° F. and 100° F., and most preferably between about 80° F. and 90° F.

The liquid phase comprises oil, water, and a minor proportion of olive pulp, some of which is in the form of floating solids. The mesh of the screen is sufficiently small, preferably about 0.020 inch diameter, to facilitate of the liquid phase 18, while retaining a major portion of the solid mass of the olive pulp in the extraction zone 29. Liquid phase 18 continuously withdrawn from extraction zone 29 flows by gravity into a collection bin 30 under the perforated portion of housing 20.

Clearance 28 between the screw rotor tip 23 and the female conical stator portion 25 is preferably adjustable. In the presently preferred embodiment, stator portion 25 is adjusted to clear rotor tip 23 by about 0.003 to about 0.020". For this purpose, stator 25 is resiliently biased against rotor 23, preferably by spring loading.

The progressively increasing root diameter of screw 19 causes clearance 27 between it and extractor screen 20 to progressively decrease downstream of hopper 15. The progressively increasing pressure on the pitless olive pulp in the extraction zone between interface 22 and downstream end 24 causes a substantially complete extraction of liquid phase 18.

We have discovered that the temperature of liquid phase 18 affects its extractibility. We believe that below about 70° F., viscosity is relatively high and extraction tends to be incomplete. Between about 70° F. and about 80° F., however, viscosity of the liquid phase 18 mixture of olive oil and water is believed to decrease. We have discovered that extraction from a pitless olive meat maintained at a temperature above about 80° F. increases the yield of product olive oil by up to about 50% as compared to extraction from pitless olive meat performed at about 70° F. or below.

In the presently preferred embodiment, olive residue 11 is fed via a liquid stream from a packing plant. The stream is taken from well water at a temperature about 62° F., and the residue is dewatered by the agency of a Coanda or DSM screen. The residue is fed to pulper 12 to remove the pits. A shell and tube heat exchanger 9 heats the pitless olive meat to about 80° to about 90° F.

This invention may be practiced with a source of olives at ambient temperature fed from a conveyor to the pulper. Where atmospheric temperature is about 80° F., it is not necessary that the heat exchanger supply heat to the pitless olive meat. However, if ambient conditions are above about 105° F., it may be desirable to operate the heat exchanger in reverse to cool the pitless olive meat somewhat to reduce risk of overheating and product degradation.

At the downstream end 24 of the screw, substantially all the liquid phase 18 has been extracted from the olive pulp. The remaining olive pulp solids are forced into narrow opening 27 and are continuously extruded as a pumice through discharge opening 26 to fall by gravity into a collection receptacle 32. The substantially dry solid olive pulp 33 is preferably salvaged for use as a biological feed material, such as livestock feed or the like.

The non-perforated stator end portion 25 of housing 20 is impervious to liquid phase withdrawal and separates the extraction zone 29 into a liquid phase withdrawal portion above bin 30 and a substantially dry solid olive pulp portion above receptacle 32.

During extraction, the temperature of the pitless olive pulp, and of liquid phase 18, does not rise above about 30° F. above that temperature maintained for the olive meat entering the extraction zone. We have discovered that a continuous press, where liquid phase 18 is progressively extracted from the pitless olive meat, is best suited for this purpose. By controlling the extraction temperature at between about 80° F. to about 100° F., extraction is performed at high efficiency while the risk of denaturing valuable proteins in the olive oil is kept acceptably small.

There are advantages to performing extraction on a continuous basis. During such extraction, as illustrated in FIG. 2, the maximum distance of liquid travel, defined from the root diameter of screw 19 through an exit port provided by the perforations in housing 20, is about one inch or less, and progressively decreases toward downstream end 24, where the olive pulp contains the least proportion of the liquid phase. Thus the length of liquid travel is small (at most about one inch) compared with batch pressing, where liquid travel distances can be as great as one foot. The efficiency of extraction of the liquid phase is correspondingly greater. Moreover, the degree of operator attention is reduced since it is not necessary to constantly monitor the progress of liquid phase extraction.

Liquid phase 18 collected in bin 30 contains oil, water and a minor proportion of olive pulp. At this stage, the liquid phase has a solids content of from about 10% to about 20%, and preferably from about 15% to about 16%. Liquid phase 18 is sent to a clarifying centrifuge 34 for separating the pulp 37 from the liquid phase to obtain a mixture 36 comprising olive oil and water. In the centrifuge, the influent is resolved into a liquid phase containing both oil and water, and a pulp phase which is decanted. Clarifying centrifuge 34 removes most of the solids so that the liquid phase as mixture 36 obtained from the centrifuge comprises olive oil and water and has a solids content of less than about 1%.

Mixture 36 becomes the influent of a purifying centrifuge 38 which is any conventional centrifuge capable of separating water and a small proportion of solid matter from mixture 36 to obtain an olive oil substantially free of water. Generally such a purifying centrifuge cannot efficiently handle more than about 1% solids content so centrifuging is performed in stages, first in clarifying centrifuge 34 to remove mostly solids and then in clarifying centrifuge 38 to remove mostly water. By staging the centrifuges, separation of solids and water from the olive oil is handled on a continuous basis to best accommodate a continuous output of liquid 18 from extractor 16.

A water phase 40 from purifying centrifuge 38 is put to a suitable disposal means such as a sewer. An oil phase 42 comprising the olive oil substantially free of water is collected in an oil storage tank 44 to await further processing. Preferably the oil is kept under a nitrogen blanket or other suitable inert atmosphere.

After storage for about one day, the olive oil has settled sufficiently for further purification. The oil is preferably filtered in a filter 46 to remove any trace impurities, such as finely-suspended solids, which would otherwise sediment if the olive oil were allowed to settle for more than a few days in storage tank 44. In filter 46 is a filter element which preferably is activated carbon, Fuller's earth, diatomaceous earth, or rise hull ash. The filtering step is preferably employed when the starting material includes green or underripe olives or includes overripe or partly rotting olives.

Following filtering, the product olive oil is stored in finished product storage tanks 48. Preferably the product oil is kept under a nitrogen blanket or other suitable inert atmosphere to retard spoilage and other degradation of the product. The storage temperature preferably is at about 50° F. to about 75° F. Below about 48° F., the oil is susceptible to clouding, and approximately 75° F. is a convenient upper limit for ambient temperatures.

The process of olive oil recovery, as described above, has an efficiency of about 70 to about 80%, limited mostly by the step of extraction of liquid phase 18 from pitless olive meat 14. However, the extraction step itself has been optimized by keeping the maximum distance of liquid travel to about one inch or less, and by controlling the temperature of extraction.

To facilitate the extraction of the liquid phase from the pitless olive meat, preferably an inert solid additive 70 is mixed with the olive meat in the juice extractor. The additive is incompressible relative to the pitless olive meat. The additive acts as a conduit by providing a surface of minimal impedance for liquid flow. In this sense, the additive functions as a deliquification agent to improve extraction of liquid phase 18 from the pitless olive meat. The additive is substantially impervious to liquid phase 18 so that liquid flow occurs along its outer surfaces. The maximum distance of liquid travel along the additive is about one inch and preferably less. Preferably, the additive is in spicular pieces while in extraction zone 29, rather than becoming balled up or gelatinous.

The additive is a material which is edible by animals, such as livestock and poultry, as the additive becomes part of the substantially dry solid olive pulp 33 collected as a feed material. The additive can be any inert material which, despite being in contact with the olive oil in liquid phase 18, will not impart harmful characteristics to the olive oil, such as extraneous taste or color. The inertness of the additive also extends to noncarcinogenicity and nonpathogenicity.

The additive preferably comprises a cellulose-containing inert material, such as rice hulls or almond hulls, or an organic inert material, such as heavily-calcined diatomaceous earth, or an inorganic inert material, such as Pearlite. Of these, rice hulls are presently preferred because of cost.

In the presently preferred practice of this invention, raw rice hulls are used as inert additive material 70. The rice hulls may, if desired, be wetted (72) before entering the extractor to decrease their permeability to olive oil, although this is not necessary. However, any wetting should be performed so as not to interfere with metering of the rice hulls into extractor 16.

FIG. 2 illustrates a cross section of a metering device 50 for mixing the inert additive material 70 with the pitless olive meat 14. The additive, preferably rice hulls, enters a feed hopper 52 and is taken up by metering screw 54. The screw is enclosed by an impervious housing 55. The rotary motion of the screw causes the rice hulls to traverse screw 54 from the feed hopper 52 to an outlet 56 at the other end of metering device 50.

Metering screw 54 and housing 55 have a first outside diameter "A" at feed hopper 52 and widen into a second diameter "B" just downstream of the feed hopper. Preferably, metering device 50 includes a water inlet 58, which optionally sprays a water containing fluid, preferably water, from a supply line, between threads of metering screw 54 onto the rice hulls. The increase in outside diameter of metering screw 54 causes an increase in the surface area of the rice hulls which is exposed to water from inlet 58. The increase in exposure ensures that the rice hulls are uniformly and completely wetted.

Preferably, metering device 50 includes a water outlet 64 to keep the level of water in screw 54 within acceptable limits if the rotary motion of the screw has been momentarily interrupted.

From metering device 50 the rice hulls are continuously introduced into hopper 15 of juice extractor 16. The percentage of rice hulls metered by volume relative to the pitless olive meat is small, approximately 1%. The rice hulls are thoroughly mixed with pitless olive meat 14 from pulper 12 by extractor screw 19. Preferably, extractor screw 19 rotates at about 200 to about 500 rpm.

The rest of the olive oil recovery process is as previously described, with an overall efficiency of olive oil recovery of at least about 90%, and preferably above 98%.

The pulp 37 separated from liquid phase 18 in clarifying centrifuge 34 is wet and contains a small proportion of olive oil. To further increase the recovery of olive oil, if desired, pulp 37 is preferably recycled by way of juice extractor 16, where it is mixed with inert additive 70, and with the continuously introduced pitless olive meat 14. The additive serves as a deliquifying agent in extractor 16 to aid in extracting liquid phase 18 containing olive oil, water, and a minor proportion of olive pulp solids from the mixture in extractor 16. A substantial portion of the recycled pulp is integrated into the mixture in extractor 16. This pulp is deliquified in the extractor and extruded through discharge opening 26 to be collected in receptacle 32.

What is claimed is:

1. An apparatus for recovering olive oil from olives comprising:

means for separating olive pits from olives to obtain a pitless olive meat;

means for mixing an inert additive with the pitless olive meat;

heat exchange means for heating the mixture to a temperature between at least about 80° F. and no more than about 110° F.;

means for introducing the additive and pitless olive meat to an extraction zone;

means for withdrawing a liquid phase comprising water, olive oil, and a minor proportion of olive pulp from a first portion of the extraction zone;

means for withdrawing a substantially dry solid olive pulp from a second portion of the extraction zone;

means for separating the minor proportion of olive pulp from the liquid phase for obtaining a mixture comprising olive oil and water; and means for separating water from the mixture for obtaining an olive oil substantially free of water.

2. An apparatus according to claim 1 further comprising metering means for mixing the inert additive with the pitless olive meat for facilitating extraction of the liquid phase from the pitless olive meat.

3. An apparatus according to claim 2 wherein the additive comprises raw rice hulls.

4. An apparatus according to claim 3 further comprising wetting means for wetting the rice hulls with a water-containing fluid before mixing such wetted hulls with the pitless olive meat to reduce the permeability of the hulls to olive oil.

5. An apparatus according to claim 1 further comprising means for recycling the separated minor proportion of pulp to the extraction zone.

6. An apparatus according to claim 1 further comprising purifying means for removing trace impurities from the product olive oil.

7. An apparatus according to claim 6 wherein the purifying means comprises a filter selected from the group consisting of diatomaceous earth, fuller's earth, rice hull ash, and activated carbon.

8. An apparatus according to claim 1 further comprising means for separating free-fatty acids from the product olive oil.

9. An apparatus for recovering olive oil from olives comprising:

means for separating olive pits from olives to obtain a pitless olive meat;

heat exchange means for maintaining the pitless olive meat at a temperature of about 80° F. to about 100° F.;

means for introducing the pitless olive meat to an extraction zone;

means for withdrawing a liquid phase comprising water, olive oil, and a minor proportion of olive pulp from a first portion of the extraction zone;

means for withdrawing a substantially dry solid olive pulp from a second portion of the extraction zone;

means for separating the minor proportion of olive pulp from the liquid phase for obtaining a mixture comprising olive oil and water; and means for separating water from the mixture for obtaining an olive oil substantially free of water.

10. An apparatus according to claim 9 further comprising metering means for mixing an inert additive with the pitless olive meat for facilitating extraction of the liquid phase from the pitless olive meat.

11. An apparatus according to claim 10 wherein the additive comprises raw rice hulls.

12. An apparatus according to claim 9 wherein the means for maintaining the pitless olive meat at a temperature at about 80° F. to about 100° F. comprises a heat exchanger.

13. An apparatus according to claim 9 further comprising wetting means for wetting olive culls with a water-containing fluid before separating olive pits from the olive culls.

* * * * *